UNITED STATES PATENT OFFICE.

JULIUS ALTSCHUL, OF BERLIN, GERMANY, ASSIGNOR TO ACTIEN GESELLSCHAFT FÜR ANILIN FABRIKATION, OF BERLIN, GERMANY.

NEW MERCURY SALT OF PARA-AMINOPHENYLARSINIC ACID.

938,939.     Specification of Letters Patent.     Patented Nov. 2, 1909.

No Drawing.    Application filed April 19, 1909.    Serial No. 490,798.    (Specimens.)

*To all whom it may concern:*

Be it known that I, JULIUS ALTSCHUL, a citizen of the United States of America, residing at Berlin, Germany, my post-office address being Hafenplatz 10, Berlin, Germany, have invented certain new and useful Improvements in a New Mercury Salt of Para-Aminophenylarsinic Acid, of which the following is a specification.

My present invention relates to a new mercury salt of para-aminophenylarsinic acid the composition of which according to analysis corresponds to the formula:

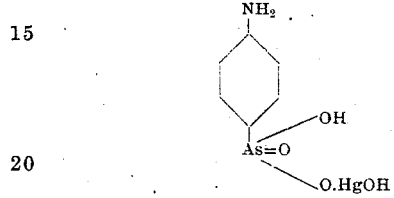

and therefore represents a basic mercury salt of para-aminophenylarsinic acid; it combines the action of mercury and of para-aminophenylarsinic acid and is therefore very valuable for medicinal purposes. In order to obtain this salt, I add, for instance, to an aqueous solution of mono-sodium para-aminophenylarsinate a suitable proportion of an alkali and the calculated proportion of a suitable mercury salt.

The following example serves to illustrate my invention the parts being by weight.

Example: 2.39 parts of the anhydrous sodium salt of para-aminophenylarsinic acid are dissolved in 10 parts of water and 5 parts of a caustic soda-lye of 8 per cent. strength are added. Into this solution while stirring is introduced a solution of 2.71 parts of mercuric chlorid, $HgCl_2$, in 60 parts of water. It separates a white precipitate which is drained, washed with water and dried at low temperature. The product thus obtained when pulverized forms a white powder, which is difficultly soluble in water, insoluble in alcohol and ether, this new salt being decomposed by the action of caustic soda lye with the formation of yellow mercuric oxid. It contains as shown by analysis about 46 per cent. of mercury and about 17 per cent. of arsenic, so that one atom of mercury is associated to one molecule of para-aminophenylarsinic acid. It is, therefore, essentially different from the mercury salt described in the U. S. Letters Patent No. 914408, in which according to the proportions of the ingredients used and to the percentage of mercury given for it (about 30 per cent.) one atom of mercury is associated with two molecules of para-aminophenylarsinic acid.

In the foregoing example the anhydrous mono-sodium salt of para-aminophenylarsinic acid is used; I may state that instead of this anhydrous salt also the corresponding quantity of the crystallized salt may be used. Furthermore for the sodium salt of this acid another soluble salt of it may be substituted, as well as another soluble salt of mercury for the mercuric chlorid employed above.

Having now described my invention and the manner in which the same may be performed, what I claim is:

As a new article of manufacture the new mercury salt of para-aminophenylarsinic acid, the composition of which corresponds to the formula $NH_2.C_6H_4.AsO_4H_2Hg$ and which may be obtained by the action of an alkali salt of para-aminophenylarsinic acid on a mercury salt in the presence of an excess of alkali, which salt in the dry state when pulverized forms a white powder difficultly soluble in water and insoluble in alcohol and ether, this new salt being decomposed by the action of caustic soda-lye with the formation of yellow mercuric oxid, which new salt contains about 46 per cent. of mercury and 17 per cent. of arsenic.

In testimony whereof I have hereunto set my hand in presence of two subscribing witnesses.

JULIUS ALTSCHUL.

Witnesses:
    HENRY HASPER,
    WOLDEMAR HAUPT.